United States Patent
Fukuchi

(10) Patent No.: US 12,301,068 B2
(45) Date of Patent: May 13, 2025

(54) PHYSICAL QUANTITY DETECTION DEVICE

(71) Applicant: Hitachi Metals, Ltd., Tokyo (JP)

(72) Inventor: Keisuke Fukuchi, Tokyo (JP)

(73) Assignee: Proterial, Ltd., Tokyo (JP)

( * ) Notice: Subject to any disclaimer, the term of this patent is extended or adjusted under 35 U.S.C. 154(b) by 457 days.

(21) Appl. No.: 17/677,454

(22) Filed: Feb. 22, 2022

(65) Prior Publication Data

US 2022/0278592 A1 Sep. 1, 2022

(30) Foreign Application Priority Data

Mar. 1, 2021 (JP) ................................. 2021-031380
Aug. 6, 2021 (JP) ................................. 2021-129787

(51) Int. Cl.
*H02K 11/25* (2016.01)
*H02K 3/28* (2006.01)
*H02K 5/22* (2006.01)

(52) U.S. Cl.
CPC ............... *H02K 11/25* (2016.01); *H02K 3/28* (2013.01); *H02K 5/225* (2013.01); *H02K 2203/06* (2013.01)

(58) Field of Classification Search
CPC .......... H02K 11/25; H02K 3/28; H02K 5/225; H02K 2203/06
See application file for complete search history.

(56) References Cited

U.S. PATENT DOCUMENTS

| | | | |
|---|---|---|---|
| 10,935,434 B2 * | 3/2021 | Yoshihara | G01K 1/14 |
| 2013/0265057 A1 * | 10/2013 | Sugimori | G01R 19/0092 |
| | | | 324/426 |
| 2013/0270973 A1 | 10/2013 | Ikemoto | |
| 2015/0096802 A1 * | 4/2015 | Itani | B60R 16/0215 |
| | | | 174/72 A |
| 2017/0016777 A1 * | 1/2017 | Yoshihara | G01K 1/08 |
| 2017/0370781 A1 * | 12/2017 | Yoshihara | G01K 7/22 |
| 2018/0017446 A1 * | 1/2018 | Yoshihara | H02K 11/25 |
| 2018/0350486 A1 * | 12/2018 | Egami | H01B 13/01209 |
| 2019/0267871 A1 * | 8/2019 | Yoshihara | H02K 5/08 |
| 2023/0009239 A1 * | 1/2023 | Fukuchi | G01N 25/72 |

FOREIGN PATENT DOCUMENTS

| | | |
|---|---|---|
| JP | S59-054829 U | 4/1984 |
| JP | 5321810 B2 | 10/2014 |
| JP | 2020-134475 A | 8/2020 |
| JP | 2020-153696 A | 9/2020 |

OTHER PUBLICATIONS

"Notice of Reasons for Refusal" Office Action issued in JP 2021-129787; mailed by the Japanese Patent Office on Jan. 28, 2025.

* cited by examiner

*Primary Examiner* — Kyung S Lee
(74) *Attorney, Agent, or Firm* — Studebaker Brackett PLLC

(57) ABSTRACT

A physical quantity detection device is provided with first and second retainers arranged to sandwich a wire, and a physical quantity sensor fixed to the wire by the first and second retainers. The physical quantity of the wire is detected by the physical quantity sensor, and the first and second retainers are fixed to the wire by being locked with each other.

14 Claims, 17 Drawing Sheets

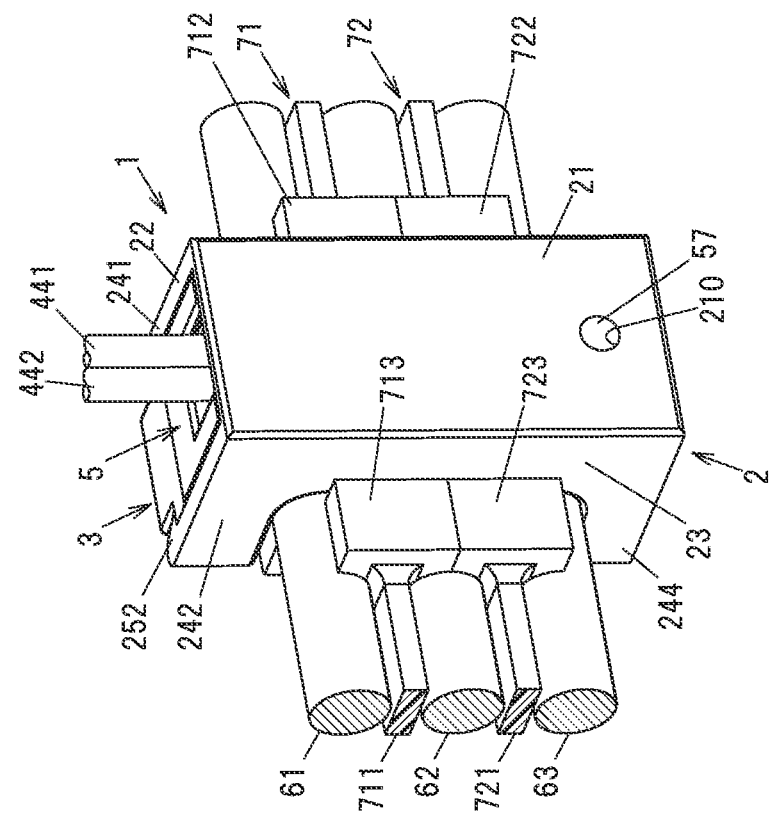
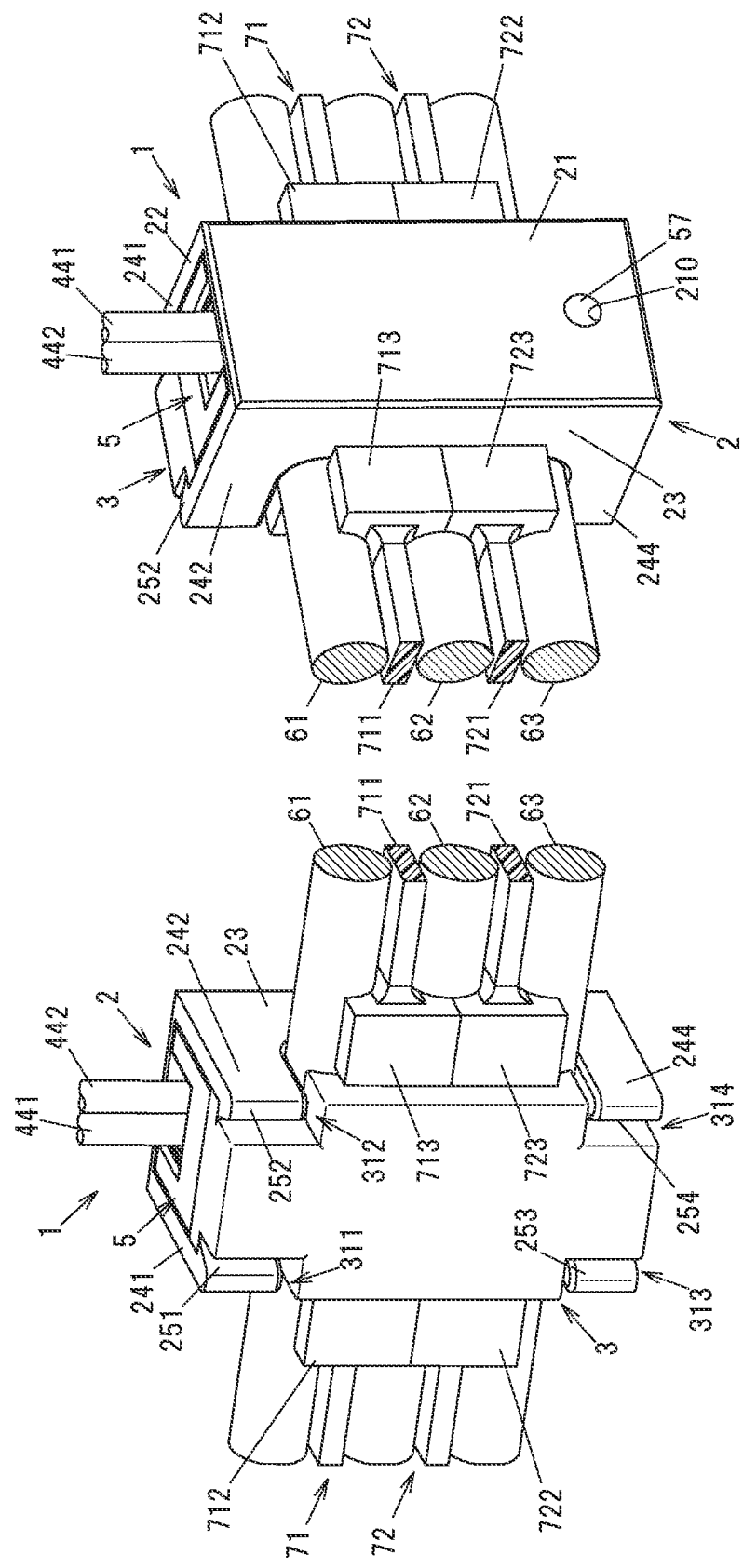

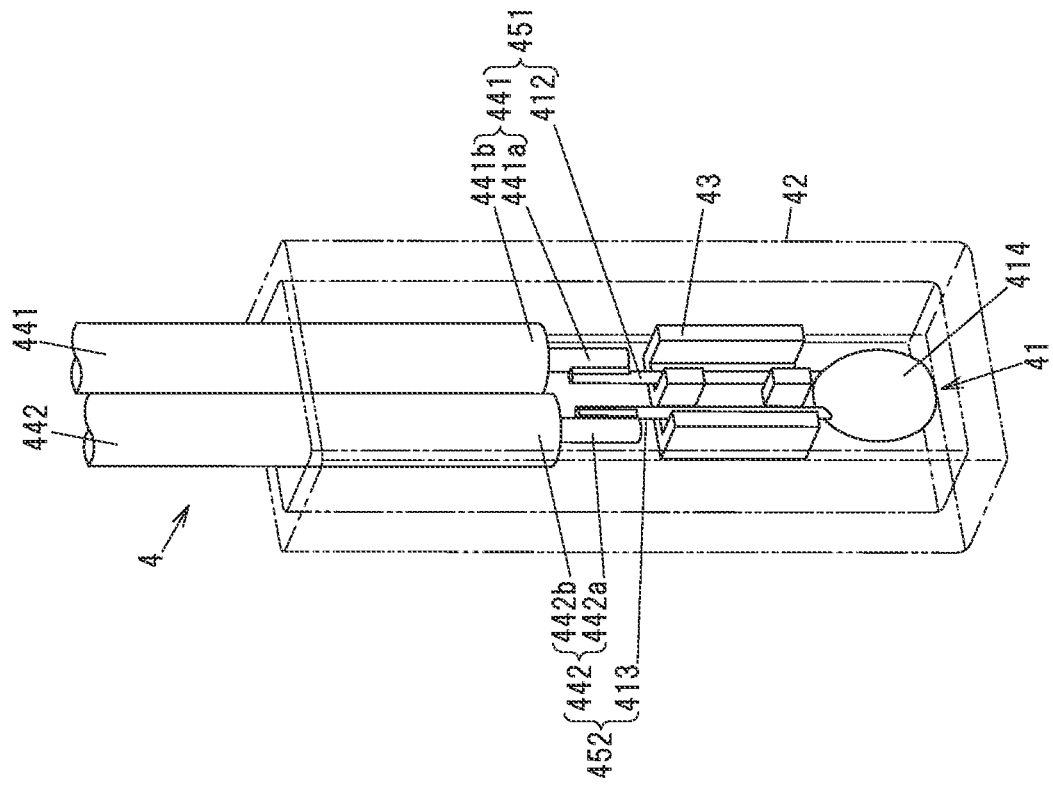
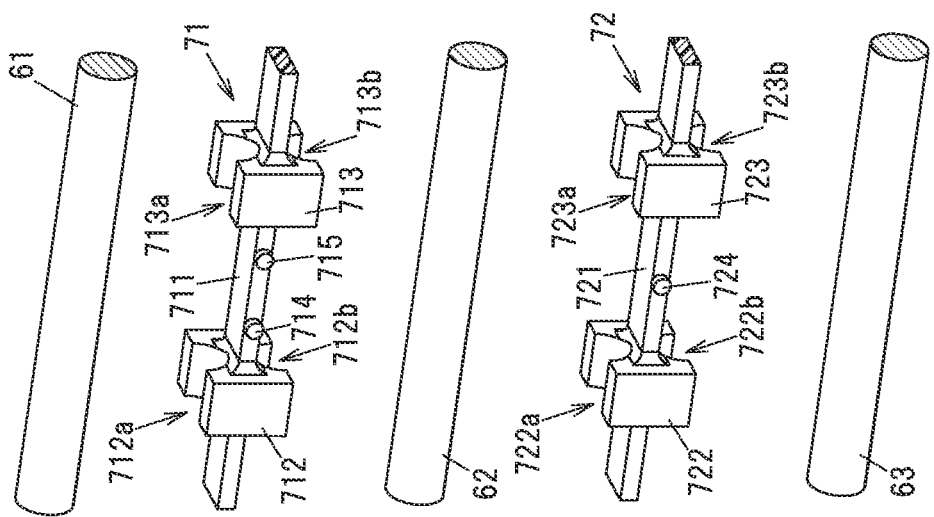

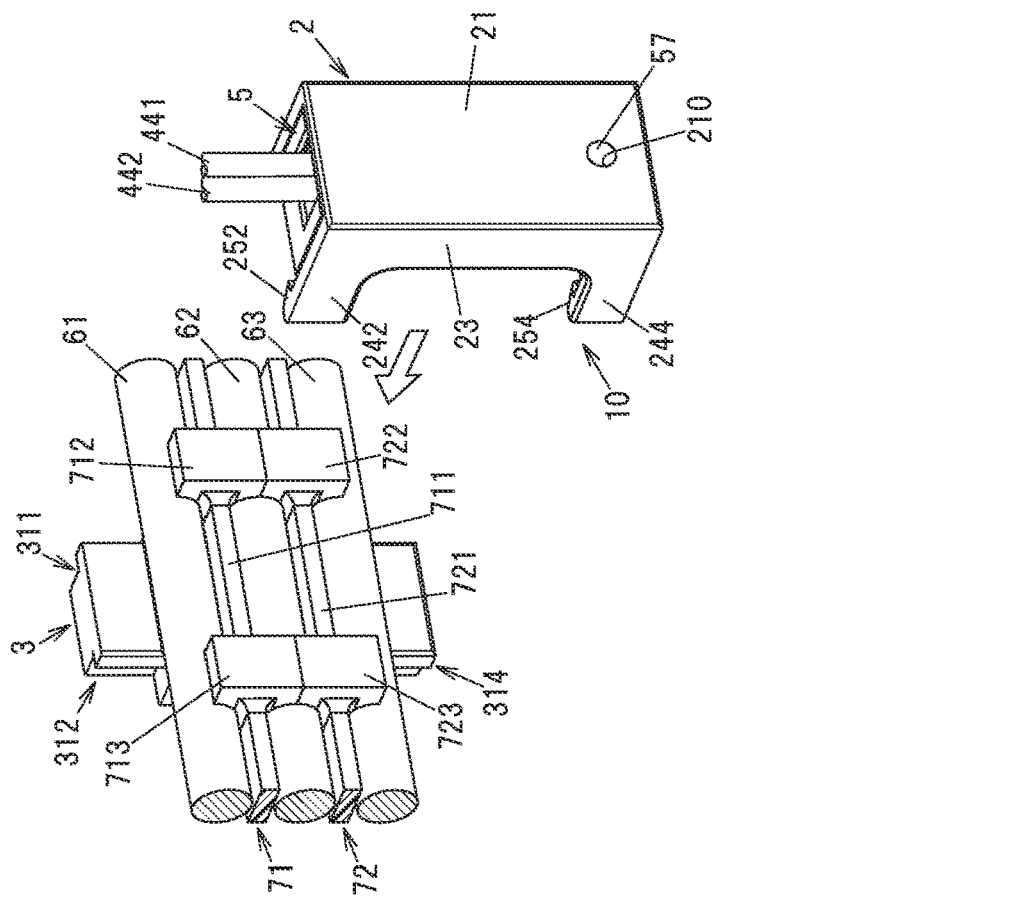
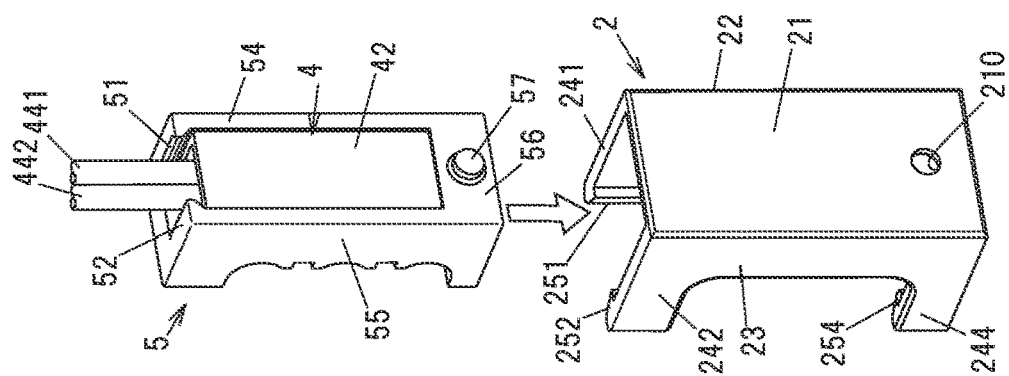
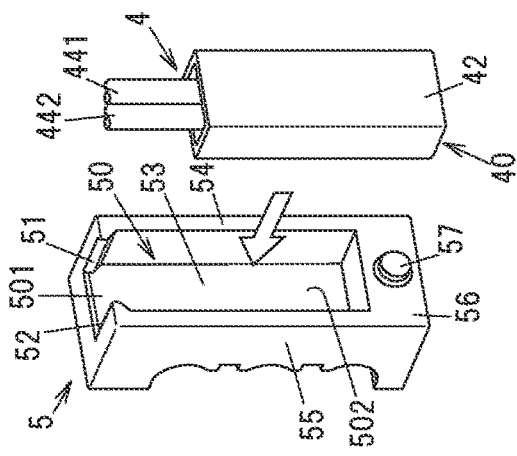

FIG. 8A
FIG. 8B
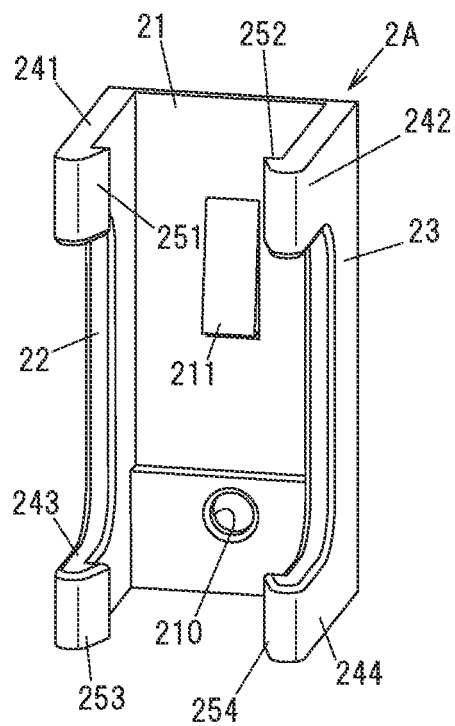
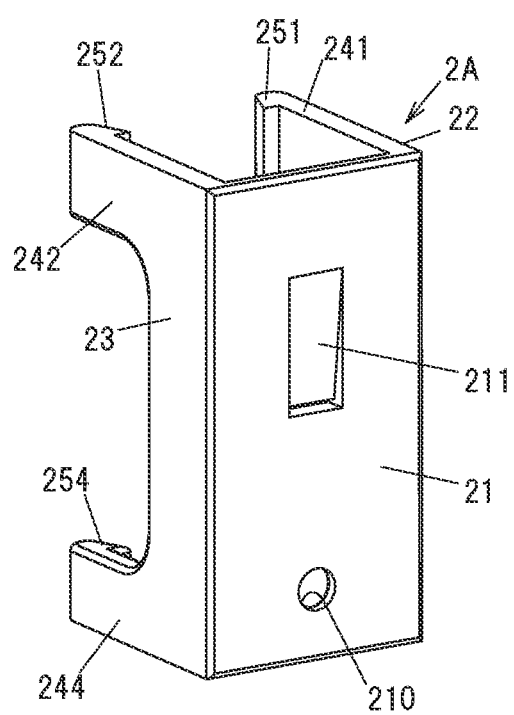

PHYSICAL QUANTITY DETECTION DEVICE

CROSS-REFERENCE TO RELATED APPLICATIONS

The present patent application claims the priority of Japanese patent application No. 2021-31380 filed on Mar. 1, 2021 and Japanese patent application No. 2021-129787 filed on Aug. 6, 2021, and the entire contents thereof are hereby incorporated by reference.

TECHNICAL FIELD

The present invention relates to a physical quantity detection device that detects the physical quantity of one or more wires.

BACKGROUND ART

Conventionally, temperature sensors have been used to detect the temperature of a rotating electrical machine, such as electric motor, generator, to suppress the rotating electrical machine from being damaged due to overheating. The rotating electrical machine described in Patent Literature 1 has an embedded type temperature detection unit in which a temperature sensor incorporating a temperature detection element such as thermistor is embedded together with a neutral wire of the rotating electrical machine in a mold member.

CITATION LIST

Patent Literature

Patent Literature 1: JP5621810B

SUMMARY OF THE INVENTION

When manufacturing the rotating electrical machine described in Patent Literature 1, it is necessary to perform an insert molding process of placing the temperature sensor together with the neutral wire of the rotating electrical machine in a mold, and then injecting a molten resin into a cavity of the mold, to form a mold member. This process hindered reduction in manufacturing costs, because it was more labor intensive and expensive than the case where resin parts are manufactured by injection molding but not by insert molding.

Therefore, the object of the present invention is to provide a physical quantity detection device that can reduce manufacturing costs as compared to a physical quantity sensor which detects the physical quantity being embedded together with the wire to be detected (i.e., a detection target wire) in the mold member.

So as to achieve the above object, one aspect of the present invention provides: a physical quantity detection device, comprising:
 first and second retainers arranged to sandwich a wire; and
 a physical quantity sensor fixed to the wire by the first and second retainers,
 wherein physical quantity of the wire is detected by the physical quantity sensor, and
 wherein the first and second retainers are fixed to the wire by being locked with each other.

Effect of Invention

According to the physical quantity detection device in the present invention, it is possible to reduce manufacturing costs as compared to a physical quantity sensor which detects the physical quantity being embedded together with the wire to be detected (i.e., a detection target wire) in the mold member.

BRIEF DESCRIPTION OF DRAWINGS

FIGS. 1A and 1B are perspective views of a physical quantity detection device in the first embodiment of the present invention as viewed from different directions.

FIG. 4 is a perspective view showing first to third wires and first and second spacers placed between the first to third wires.

FIG. 5 is a perspective view of the inside of a temperature sensor.

FIGS. 7A to 7C are explanatory diagrams showing an assembly process of the physical quantity detection device.

FIGS. 8A and 8B are perspective views showing a first retainer in the second embodiment.

BEST MODE FOR CARRYING OUT THE INVENTION

The First Embodiment

The first embodiment of the present invention will be explained with referring to FIGS. 1A to 7C.

Figure 2:
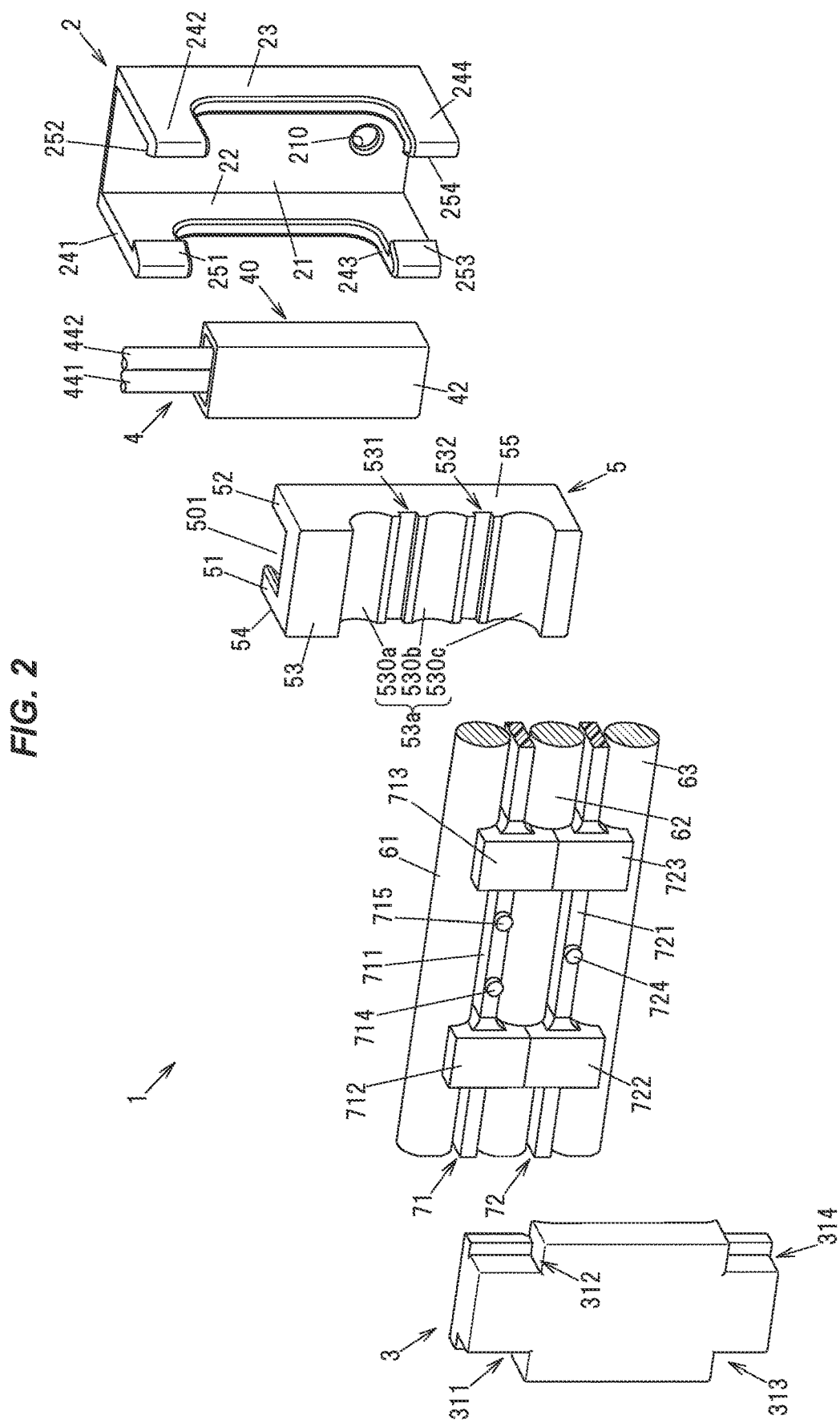
FIG. 2 is an exploded perspective view of the physical quantity detection device viewed from the direction shown in FIG. 1A.

FIGS. 1A and 1B are perspective views of a physical quantity detection device 1 in the first embodiment of the present invention as viewed from different directions. FIG. 2 is an exploded perspective view of the physical quantity detection device 1 viewed from the direction shown in FIG.

Figure 3:
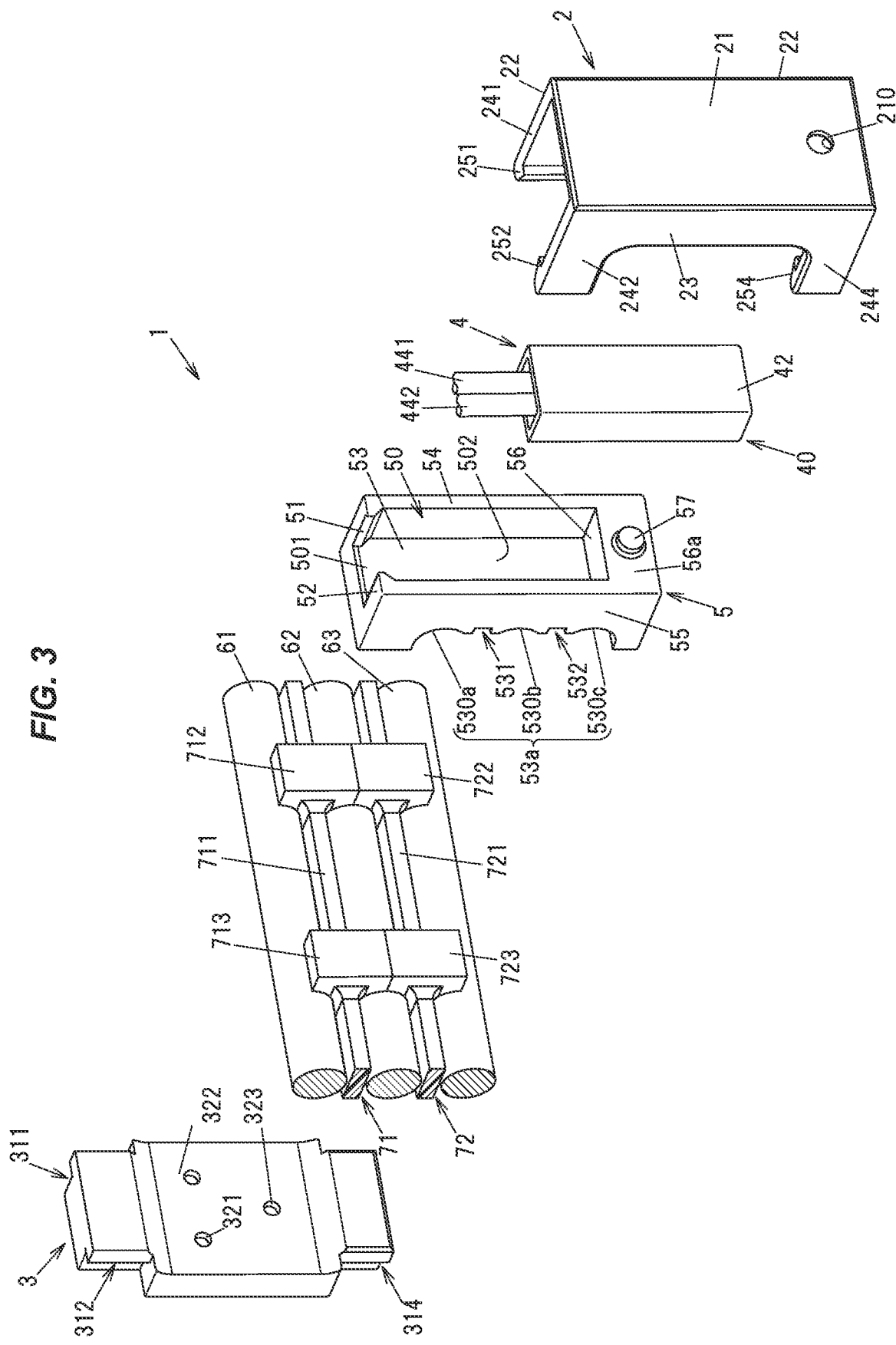
FIG. 3 is an exploded perspective view of the physical quantity detection device as viewed from the direction shown in FIG. 1B.
Figure 6:
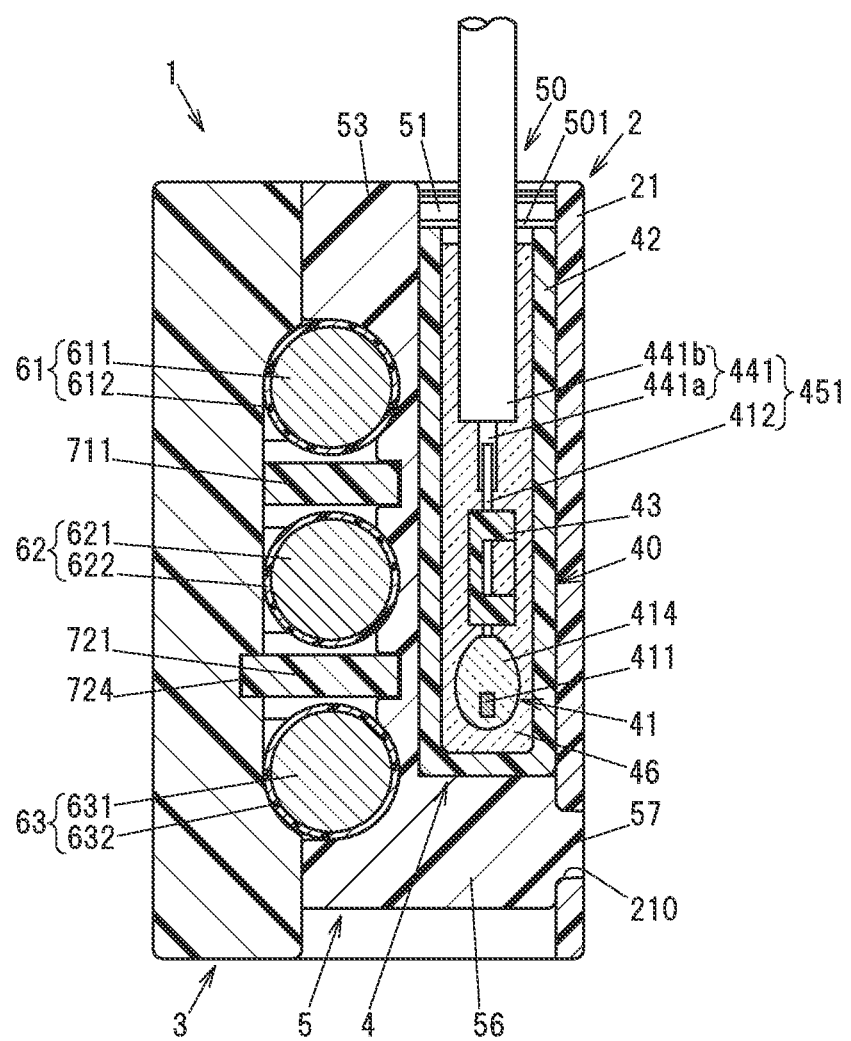
FIG. 6 is a cross-sectional view of the physical quantity detection device.

1A. FIG. 3 is an exploded perspective view of the physical quantity detection device 1 as viewed from the direction shown in FIG. 1B. FIG. 4 is a perspective view showing first, second and third electric wires 61, 62, 63 (Hereinafter simply referred to as "first to third wires 61 to 63") and first and second spacers 71, 72 placed between the first to third wires 61 to 63. FIG. 5 is a perspective view of the inside of a temperature sensor 4. FIG. 6 is a cross-sectional view of the physical quantity detection device 1. FIGS. 7A to 7C are explanatory diagrams showing an assembly process of the physical quantity detection device 1.

For the physical quantity detection device 1, the first to third wires 61 to 63 are detection targets. The physical quantity detection device 1 is configured to detect physical quantity of the first to third wires 61 to 63. In the present embodiment, the case of detecting the temperature of the first to third wires 61 to 63 as physical quantity will be explained. However, it is also possible to detect the strength of magnetic field generated by the current flowing through the first to third wires 61 to 63 as the physical quantity.

The first to third wires 61 to 63 are connected to three-phase windings of the rotating electrical machine, respectively. The rotating electrical machine herein may be a motor that rotates a rotor by a magnetic field generated by three-phase alternating current on a stator, a generator that generates three-phase alternating current by rotation of a rotor, or a motor-generator that has both functions of a motor and a generator.

The first to third wires 61 to 63 are insulated electric wires, that are composed of conductors 611, 621, 631, each of which is made of a good conductive material such as copper, and covered with coating layers 612, 622, 632, each of which is made of insulating resin such as enamel, as shown in a cross-sectional view in FIG. 6. In the present embodiment, each of the first to third wires 61 to 63 is a round single wire with a circular cross-section. However, each of the first to third wires 61 to 63 may be, e.g., a rectangular wire with a rectangular cross-section.

The first and third wires 61 to 63 are arranged in parallel (i.e., arranged side by side) via first and second spacers 71, 72 each of which is made of a resin. The first spacer 71 is located between the first wire 61 and the second wire 62, while the second spacer 72 is located between the second wire 62 and the third wire 63.

As shown in FIG. 4, the first spacer 71 integrally (e.g., as one piece) includes a flat-shape plate portion 711 that extends parallel to the first and second wires 61, 62, and a pair of holding portions 712, 713, which are separated from each other in a longitudinal direction of the plate portion 711. The pair of holding portions 712, 713 are provided with recessed portions 712a, 713a configured to accommodate a portion of the first wire 61, and recessed portions 712b, 713b configured to accommodate a portion of the second wire 62, respectively.

Similarly, the second spacer 72 integrally (e.g., as one piece) includes a flat-shape plate portion 721 that extends parallel to the second and third wires 62, 63, and a pair of holding portions 722, 723, which are separated from each other in a longitudinal direction of the plate portion 721. The pair of holding portions 722, 723 are provided with recessed portions 722a, 723a configured to accommodate a portion of the second wire 62, and recessed portions 722b, 723b configured to accommodate a portion of the third wire 63, respectively.

The first spacer 71 further includes engaging protrusions 714, 715 protruding from the plate portion 711 along a direction perpendicular to the alignment direction of the first wire 61 and the second wire 62. Similarly, the second spacer 72 further includes an engaging protrusion 724 protruding from the plate portion 721 along a direction perpendicular to the alignment direction of the second wire 62 and the third wire 63.

In the first spacer 71, the two engaging protrusions 714, 715 are provided between the pair of holding portions 712, 713. In the second spacer 72, the one engaging protrusion 724 is provided between the pair of holding portions 722, 723. The engaging protrusions 714, 715, 724 are used for positioning and fixing relative to a second retainer 3 of the physical quantity detection device 1 to be described below.

The physical quantity detection device 1 includes first and second retainers 2, 3 configured to be arranged with sandwiching the first to third wires 61 to 63 therebetween, a temperature sensor 4 configured to be fixed to the first and third wires 61 to 63 by the first and second retainers 2, 3, and a sensor holder 5 provided with a holding space 50 configured to hold the temperature sensor 4. The first to third wires 61 to 63 are located parallel to each other between the first retainer 2 and the second retainer 3. The first and second retainers 2, 3 and the sensor holder 5 are respectively single resin parts formed by injection molding but not by insert molding. In order to improve the accuracy of temperature detection, as a resin material for the sensor holder 5, it is preferable to use a resin material with high thermal conductivity of 1 W/m·K or more, and more preferable to use a material with thermal conductivity of 3 W/m·K or more.

The physical quantity detection device 1 detects the temperature of the first to third wires 61 to 63 by means of the temperature sensor 4. The temperature sensor 4 includes a thermistor 41, which converts the physical quantity (temperature in the present embodiment) into an electrical signal, a case member 42 configured to house the thermistor 41, a holding member 43 being housed in the case member 42, and a pair of signal wires 441, 442, which are led out (i.e., drawn) from the case member 42, as shown in FIGS. 5 and 6.

The case member 42 is a bottomed cylindrical-shaped (i.e., bottomed tubular) mold member composed of injection-molded resin. The inside of the case member 42 is filled with a filler 46. The filler 46 is e.g., epoxy resin. Hereinafter, the case member 42 and parts (i.e., the thermistor 41, the holding member 43, the filler 46, and the signal wires 441, 442) housed within the case member 42 are referred as a main body 40 of the temperature sensor 4.

The thermistor 41 includes a metal oxide sintering member 411 as a sensing element of which electrical resistance changes depending on temperature (see FIG. 6), a pair of lead wires connected to the metal oxide sintering member 411, and a sealing member 414 which seals or encapsulates the metal oxide sintering member 411. The sealing member 414, e.g., is composed of a glass sealing material and is formed in an elliptical sphere.

Respective one ends of the pair of lead wires 412, 413 are connected to the metal oxide sintering member 411 inside the sealing member 414. Respective other ends of the pair of lead wires 412, 413 are connected to the pair of signal wires 441, 442 outside the sealing member 414. The signal wires 441, 442 are insulated wires are, for example, composed of core wires 441a, 442a, each of which is composed of stranded wires with multiple strands, covered with insulators 441b, 442b made of resin, respectively.

The pair of lead wires 412, 413 and the pair of signal wires 441, 442 constitute signal lines 451, 452 configured to transmit the electrical signals output by the thermistor 41. The signal lines 451, 452 transmit the electrical signals to a control device for controlling e.g., a rotating electrical machine. When the detected temperature is higher than a predetermined value, the control device suppresses the current flow to the rotating electrical machine and prevents damage caused by overheating of the rotating electrical machine.

As shown in FIG. 3, the sensor holder 5 includes a lead-out window 501 for leading out the signal wires 441, 442 from the holding space 50, and a pair of locking protrusion 51, 52 which prevent the case member 42 of the temperature sensor 4 from escaping out from the lead-out window 501. In the present embodiment, the lead-out window 501 is provided between the pair of locking protrusions 51, 52. The signal wires 441, 442 are led out from the lead-out window 501 along the direction of the first to third wires 61 to 63.

The sensor holder 5 further includes an opening 502, which opens the holding space 50 toward the first retainer 2, and is closed (i.e., blocked) by the first retainer 2. The case member 42 of the temperature sensor 4 is held in the holding space 50 of sensor holder 5 to prevent it from being pulled out of aperture 502 by the first retainer 2.

The sensor holder 5 further includes an opposing wall 53 opposite to (i.e., facing) the first to third wires 61 to 63, a pair of side walls 54, 55 facing to each other with respect to the holding space 50 (i.e., with sandwiching the holding space 50) in parallel to an axial direction of the first to third wires 61 to 63, and a bottom wall 56 closing the holding space 50 on the opposite side of the lead-out window 501. The case member 42 of the temperature sensor 4 is surrounded from three directions by the opposing wall 53 and the pair of side walls 54, 55.

The pair of locking protrusions 51, 52 are provided at respective one ends of the pair of side walls 54, 55. On the bottom wall 56, an engaging protrusion 57 protruding along a direction perpendicular to the alignment direction of the first to third wires 61 to 63. The engaging protrusion 57 is erected (i.e., standing) from an opposing surface 56a facing to the first retainer 2 at the bottom wall 56.

On an outer wall 21 of the first retainer 2, an engaging recess 210, which is engaged with the engaging protrusion 57. In the sensor holder 5, the relative movement in the alignment direction of the first to third wires 61 to 63 with respect to the first retainer 2 is regulated by the engagement of the engaging protrusion 57 with the engaging recess 210.

On the opposing wall 53 of the sensor holder 5, the opposing surface 53a facing to the first to third wires 61 to 63 is provided with concave surfaces 530a, 530b, 530c, that are recessed in accordance with circumferences of the first to third wires 61 to 63. The curvature of the concave surfaces 530a, 530b, 530c viewed from the axial direction of the first to third wires 61 to 63 are equal to or slightly greater than the curvature of circumference surfaces of the first to third wires 61 to 63. The shape of the sensor holder 5, which has the concave surfaces 530a, 530b, 530c, makes it easier for the heat of the first to third wires 61 to 63 to be transferred to the temperature sensor 4 through the sensor holder 5.

Further, the opposing wall 53 is provided with a first engaging groove 531 configured to be engaged with the plate portion 711 of the first spacer 71, and a second engaging groove 532 configured to be engaged with the plate portion 721 of the second spacer 72. The plate portion 711 of the first spacer 71 engages with the first engaging groove 531 between the pair of holding portions 712, 713. The plate portion 721 of the second spacer 72 engages with the second engaging groove 532 between the pair of holding portions 722, 723.

The temperature sensor 4 and the sensor holder 5 are located between the first retainer 2 and the first and third wires 61 to 63. The temperature sensor 4 is fixed to the first to third wires 61 to 63 by the first and second retainers 2, 3 being locked with each other.

The first retainer 2 includes an outer wall 21 configured to close the opening 502 of the holding space 50 of the sensor holder 5, a pair of side walls 22, 23 facing to the side walls 54, 55 of the sensor holder 5, respectively, arms 241 to 244 extending from the pair of side walls 22, 23 toward the second retainer 3 beyond the first to third wires 61 to 63, and engaging protrusions 251 to 254 at respective tip ends of the arms 241 to 244.

In the present embodiment, the first retainer 2 has four arms 241 to 244. Of these, two arms 241, 243 extend from one side wall 22 of the side walls 22, 23 toward the second retainer 3. The other two arms 242, 244 extend from the other side wall 23 of the side walls 22, 23 toward the second retainer 3.

The second retainer 3 is a long and substantially rectangular shape in the alignment direction of the first to third wires 61 to 63, with engaging recesses 311 to 314 formed at both ends in the longitudinal direction. The engaging protrusions 251 to 254 of the first retainer 2 respectively engage with the engaging recesses 311 to 314. By the engagement of the engaging recesses 311 to 314 with the engaging protrusions 251 to 254, the first retainer 2 and the second retainer 3 are locked with each other with sandwiching the first to third wires 61 to 63 and the temperature sensor 4 therebetween, and fixed to the first to third wires 61 to 63.

In addition, the second retainer 3 is provided with engaging recesses 321 to 323 configured to be engaged with the engaging protrusions 714, 715 of the first spacer 71 and the engaging protrusion 724 of the second spacer 72 respectively. The second retainer 3 is positioned relative to the first to third wires 61 to 63, by the engagement of the engaging protrusions 714, 715, 724 of the first and second spacers 71, 72 with the engaging recesses 321 to 323.

FIGS. 7A to 7C are explanatory diagrams showing an assembly process of the physical quantity detection device 1. The physical quantity detection device 1 is assembled by the first to third steps shown in FIGS. 7A to 7C. In the first step, the main body 40 of the temperature sensor 4 is housed into the holding space 50 through the opening 502 of the sensor holder 5, as shown in FIG. 7A. In the second step, the sensor holder 5, which houses the main body 40 of the temperature sensor 4, is placed between the pair of side walls 22, 23 of the first retainer 2, and the engaging protrusion 57 of the sensor holder 5 is engaged with the engaging recess 210 of the first retainer 2, as shown in FIG. 7B. By these steps, an assembly 10 composed of the first retainer 2, the temperature sensor 4, and the sensor holder 5 is constituted (see FIG. 7C).

In the third step, as shown in FIG. 7C, the engaging protrusions 714, 715, 724 of the first and second spacers 71, 72 are engaged with the engaging recesses 321 to 323 of the second retainer 3, the first to third wires 61 to 63 are sandwiched between the assembly 10 and the second retainer 3, then the engaging protrusions 251 to 254 of the first retainer 2 are engaged with the engaging recesses 311 to 314 of the second retainer 3. The physical quantity detection device 1 is thus assembled.

According to the first embodiment of the present invention described above, it is possible to manufacture a physical quantity detection device 1 without the need for insert molding process, thereby reducing production costs. In addition, by matching the size and the like of the holding space 50 in the sensor holder 5 to a general purpose (i.e., versatile) temperature sensor 4 on the market, it is possible to further reduce the cost by using a commercially available temperature sensor 4 (standard product of the sensor manufacturer). The same effect can be achieved by modifying the first embodiment to be described below.

In the first embodiment, the case where the first retainer 2 has the four arms 241 to 244, and the engaging protrusions 251 to 254 at the respective tip ends of the arms 241 to 244 are engaged with the engaging recesses 311 to 314 of the second retainer 3 respectively is described. On the contrary, the second retainer may have arms and the engaging protrusions provided at the respective tip ends of the arms may be engaged with the engaging recesses formed at the first retainer, so as to lock the first retainer and the second retainer with each other.

In the first embodiment, the case where the engaging protrusions 714, 715, 724 of the first and second spacers 71, 72 are engaged with the engaging recesses 321 to 323 of the second retainer 3 is described. In a modification, the engaging protrusions provided on at least one of the first and second spacers may be engaged with the engaged recesses formed on the first retainer or the sensor holder 5. In this case, the second retainer 3 and the first and second spacers 71, 72 do not have to be engaged with each other.

Furthermore, the relationship between the engaging protrusions and the engaging recesses in the first embodiment may be reversed from each other. For example, engaging recesses may be formed at the tip ends of the arms of the first retainer, and the engaging recesses may be engaged with the engaging protrusions provided in the second retainer. The same applies to the relationship between the first retainer 2 and the sensor holder 5, and the relationship between the second retainer 3 and the first and second spacers 71, 72.

The Second Embodiment

Figure 9:
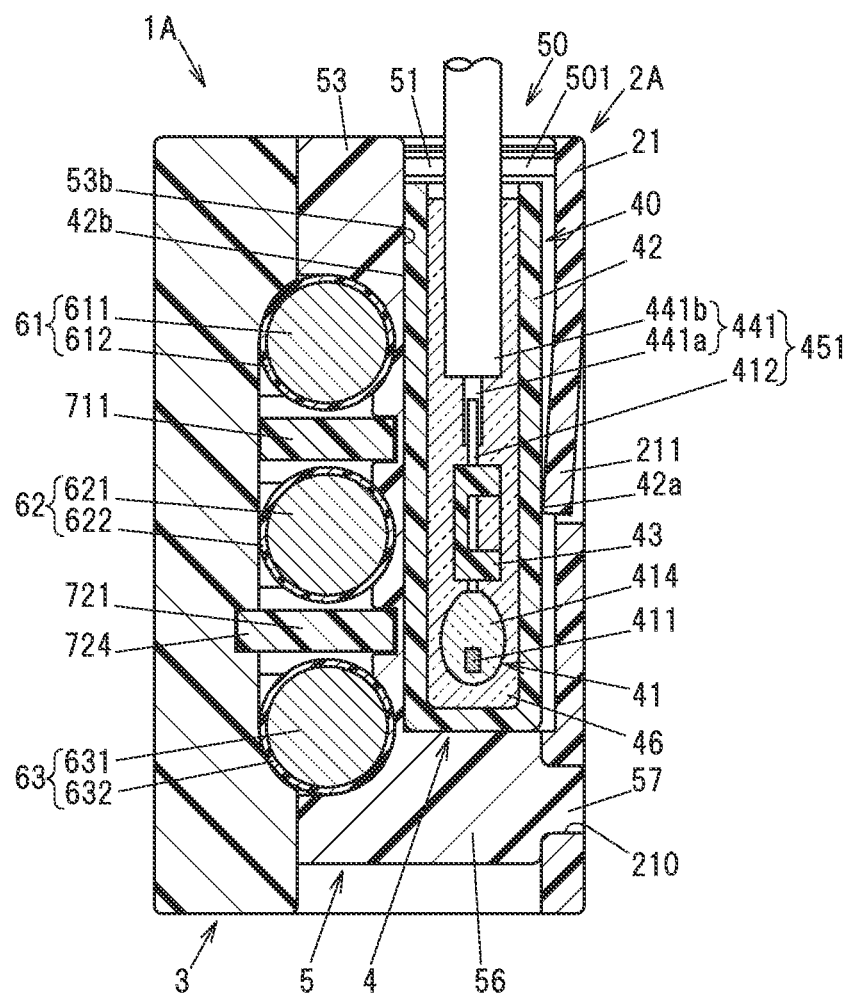
FIG. 9 is a cross-sectional view of a physical quantity detection device in the second embodiment.

Next, a physical quantity detection device 1A, which represents the second embodiment, will be explained with referring to FIGS. 8A, 8B and 9.

FIGS. 8A and B are perspective views showing a first retainer 2A in the second embodiment. FIG. 9 is a cross-sectional view of a physical quantity detection device 1A in the second embodiment. In FIGS. 8A, 8B and 9, the constitutional elements common to those described in the first embodiment shall be provided with the same signs as those attached to FIGS. 1A to 7C and the redundant description thereof will be omitted.

In the present embodiment, the physical quantity detection device 1A is configured differently from the first embodiment in which the case member 42 of the temperature sensor 4 is pressed elastically toward an inner surface on the side of the first to third wires 61 to 63 in the holding space 50, and specifically toward an inner surface 53b on the side of the holding space 50 at the opposing wall 53 of the sensor holder 5.

In the present embodiment, the outer wall 21 of the first retainer 2A has an elastic portion 211 configured to press the case member 42 of the temperature sensor 4. The elastic portion 211 is a tongue piece shape portion, as a part of the outer wall 21 protruding toward the holding space 50. The case member 42 of the temperature sensor 4 has an abutting surface 42a configured to abut the elastic portion 211, and a side surface 42b opposite to the abutting surface 42a. The side surface 42b contacts the inner surface 53b of the opposing wall 53 of the sensor holder 5 with no gap. This makes it easier to transfer the heat of the first to third wires 61 to 63 wires from the sensor holder 5 to the case member 42.

This second embodiment has the same effect as that of the first embodiment, and also makes it easier to transfer the heat of the first to third wires 61 to 63 to the case member 42 of the temperature sensor 4, thereby increasing the accuracy of the temperature detection of the first to third wires 61 to 63.

The Third Embodiment

Next, a physical quantity detection device 1B in the third embodiment will be explained with referring to FIGS. 10 to 12.

Figure 10:
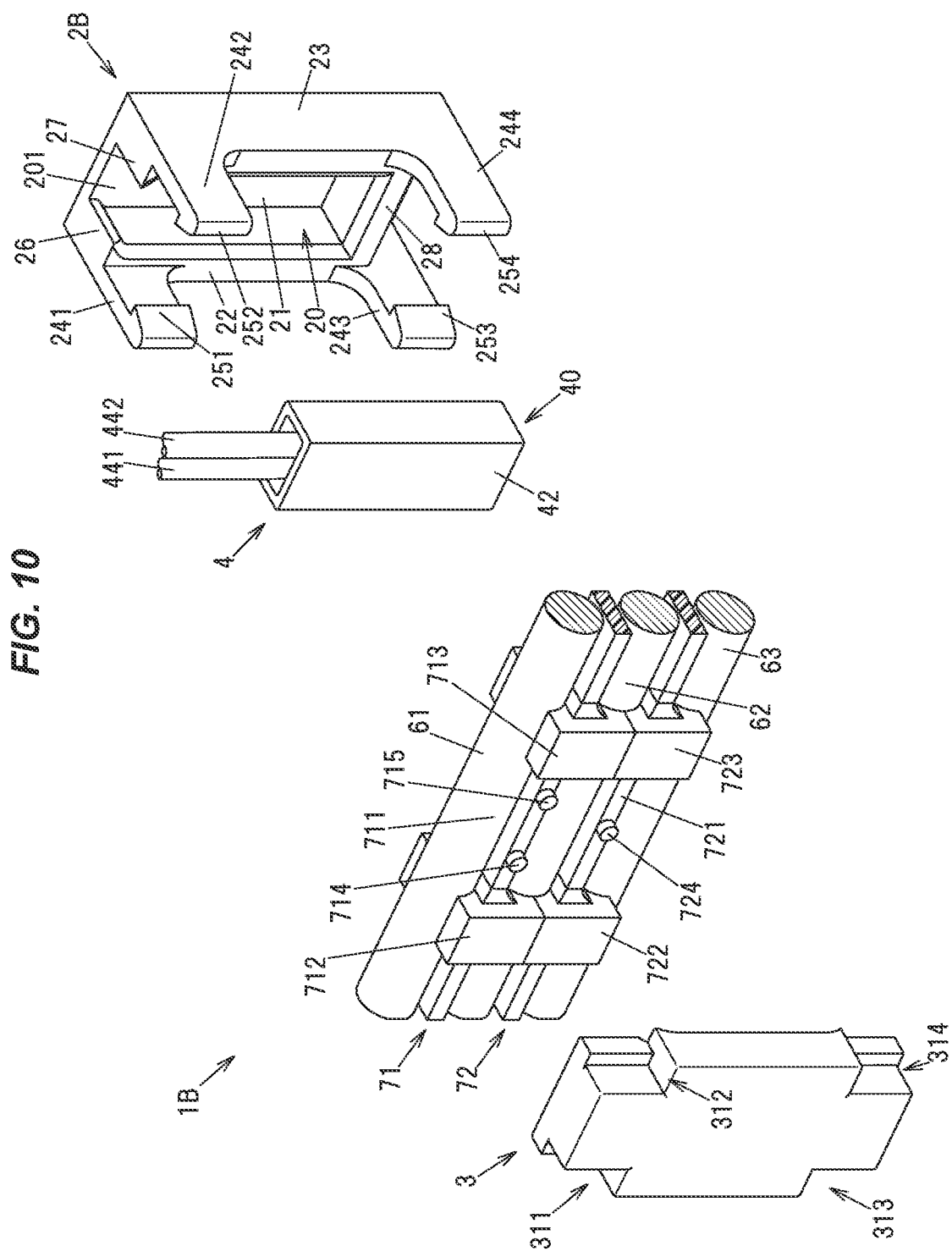
FIG. 10 is an exploded perspective view of a physical quantity detection device in the third embodiment.
Figure 11:
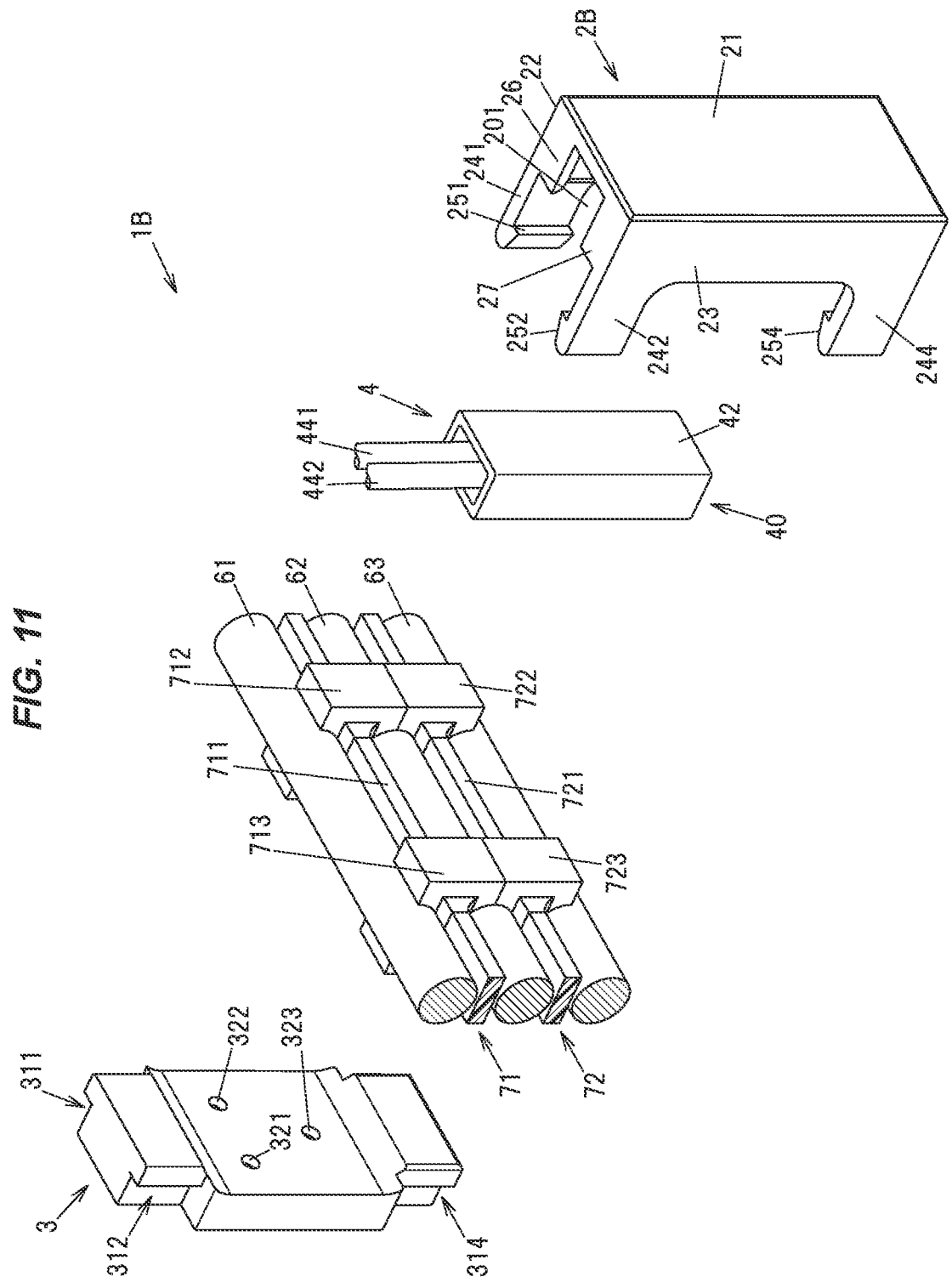
FIG. 11 is an exploded perspective view of the physical quantity detection device in the third embodiment.

FIGS. 10 and 11 are exploded perspective views of a physical quantity detection device 1B in the third embodiment. FIG. 12 is a cross-sectional view of the physical quantity detection device 1B in the third embodiment.

Figure 12:
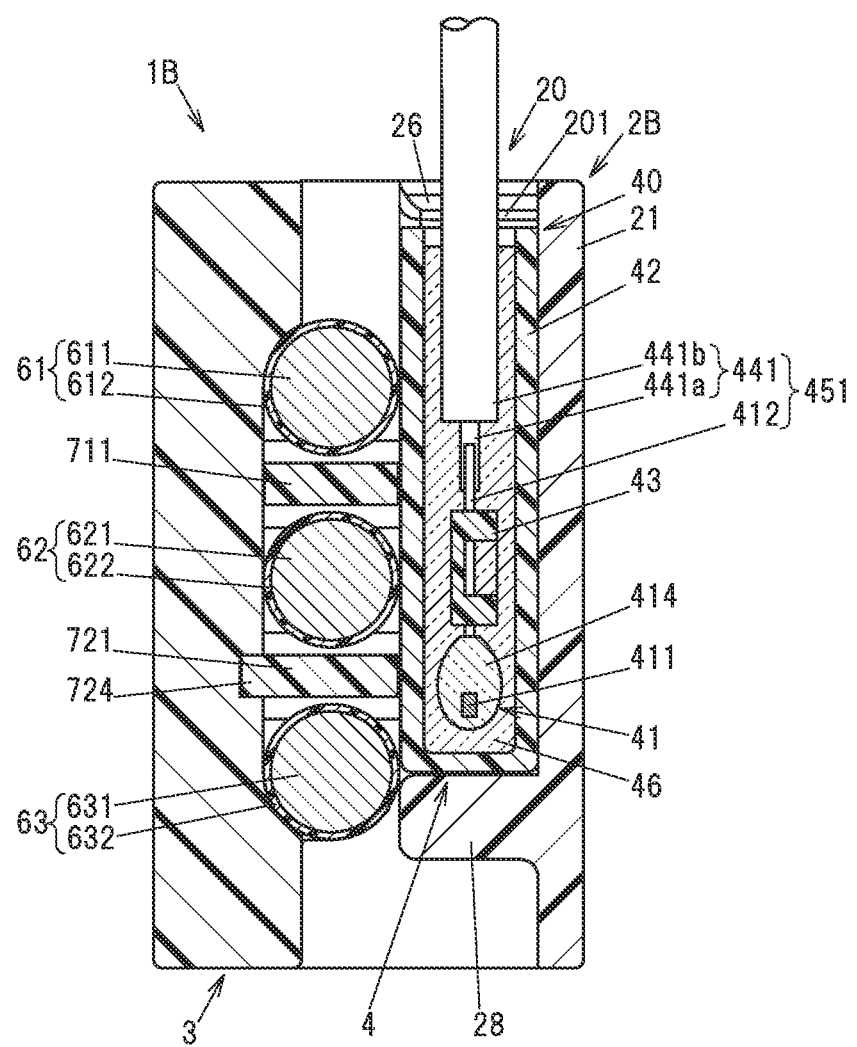
FIG. 12 is a cross-sectional view of the physical quantity detection device in the third embodiment.

In FIGS. 10 to 12, the constitutional elements common to those described in the first embodiment shall be provided with the same signs as those attached to FIGS. 1A to 7C and the redundant description thereof will be omitted.

The physical quantity detection device 1B in the third embodiment does not have the sensor holder 5, and the first retainer 2B has a holding space 20 for holding the temperature sensor 4. The holding space 20 is open toward the first to third wires 61 to 63, and the case member 42 of the temperature sensor 4 is facing the first to third wires 61 to 63.

The first retainer 2B is provided with a lead-out window 201, which leads out the signal wires 441, 442 of the temperature sensor 4 from the holding space 20. In addition, the first retainer 2B includes locking protrusions 26, 27, which prevent the case member 42 from escaping through the lead-out window 201, and a bottom wall 28 at the end opposite to the locking protrusions 26, 27.

This third embodiment has the same effect as the first embodiment, and it also eliminates the need for the sensor holder 5, thereby further reducing costs. This also makes it easier to transfer the heat of the first to third wires 61 to 63 to the case member 42 of the temperature sensor 4, thereby increasing the accuracy of the temperature detection of the first to third wires 61 to 63.

The Fourth Embodiment

Figure 14:
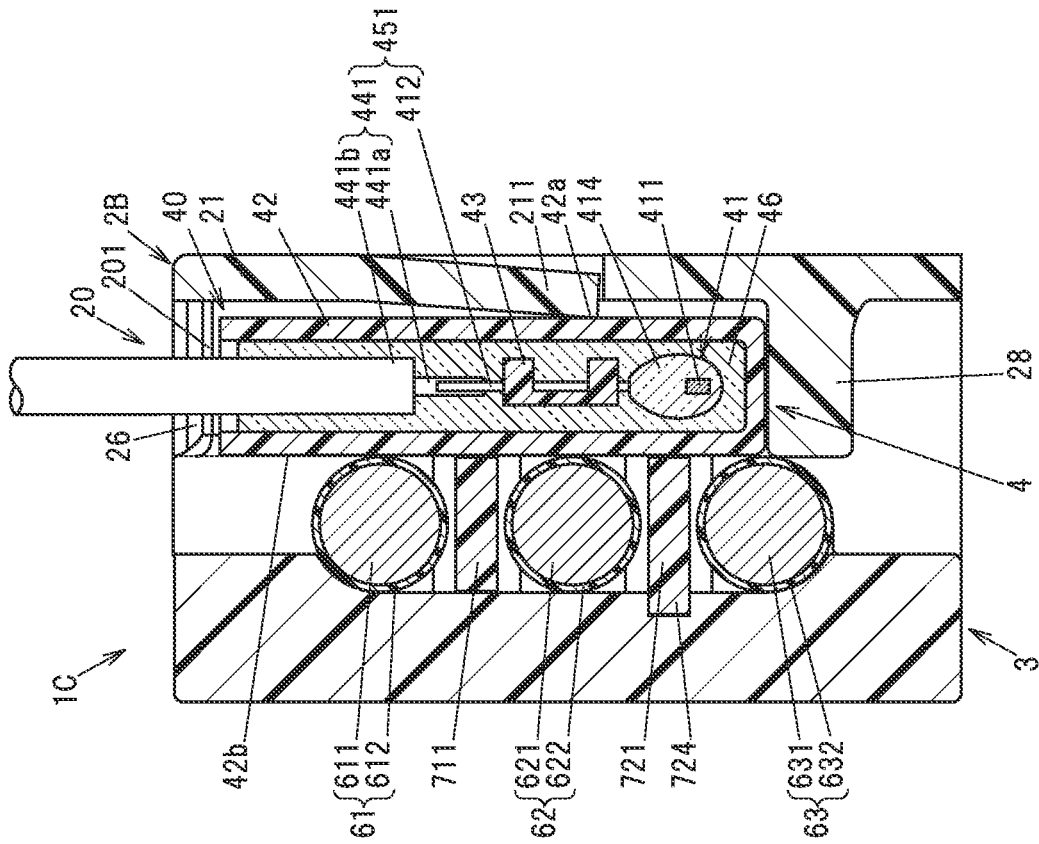
FIG. 14 is a cross-sectional view of a physical quantity detection device in the fourth embodiment.

Next, a physical quantity detection device 1C in the fourth embodiment will be explained with referring to FIGS. 13 and 14.

Figure 13:
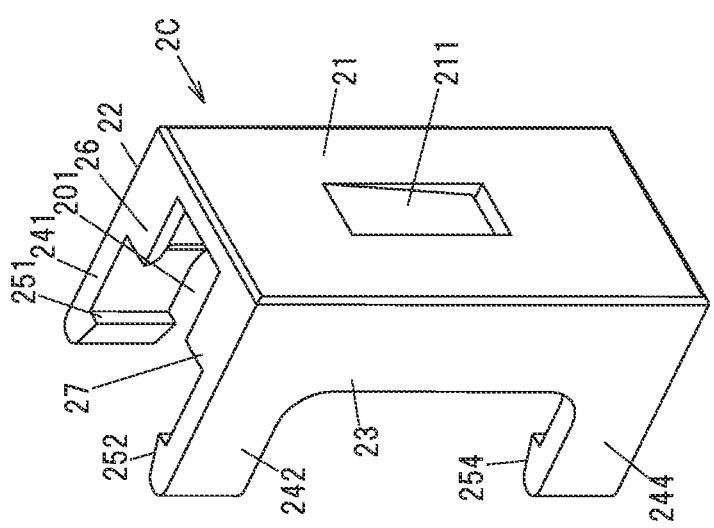
FIG. 13 is a perspective view showing a first retainer in the fourth embodiment.

FIG. 13 is a perspective view showing a first retainer 2C in the fourth embodiment. FIG. 14 is a cross-sectional view of a physical quantity detection device 1C in the fourth embodiment. In FIGS. 13 and 14, the constitutional elements common to those described in the first to third embodiments shall be provided with the same signs as those attached to FIGS. 1A to 12 and the redundant description thereof will be omitted.

The physical quantity detection device 1C in the present embodiment is configured differently from the third embodiment in which the case member 42 of the temperature sensor 4 is pressed elastically toward the first to third wires 61 to 63.

In the present embodiment, an outer wall 21 of the first retainer 2C has an elastic portion 211 configured to press the case member 42 of the temperature sensor 4 toward the first to third wires 61 to 63. Similarly to the second embodiment, the elastic portion 211 is a tongue piece shape portion, as a part of the outer wall 21 protruding toward the holding space 50. The case member 42 of the temperature sensor 4 has an abutting surface 42a configured to abut the elastic portion 211, and a side surface 42b opposite to the abutting surface 42a. The side surface 42b contacts the first to third wires 61 to 63. This makes it easier to transfer the heat of the first to third wires 61 to 63 wires to the case member 42.

According to the fourth embodiment, the heat of the first to third wires 61 to 63 are more easily transferred to the case member 42 of the temperature sensor 4 than in the third embodiment, thereby further improving the accuracy of the temperature detection of the first to third wires 61 to 63.

The Fifth Embodiment

Next, a physical quantity detection device 1D in the fifth embodiment will be explained with referring to FIGS. 15 to 19.

Figure 15:
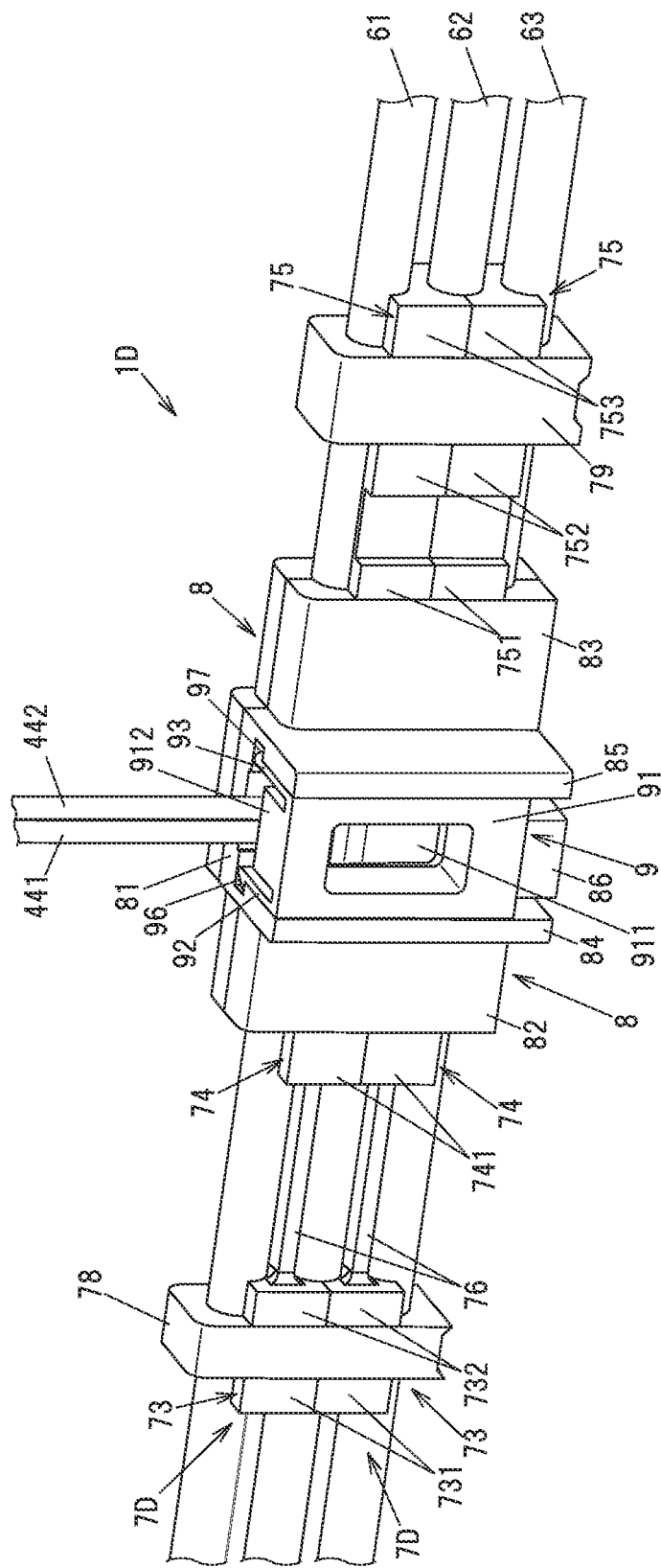
FIG. 15 is a perspective view showing a physical quantity detection device in the fifth embodiment.
Figure 16:
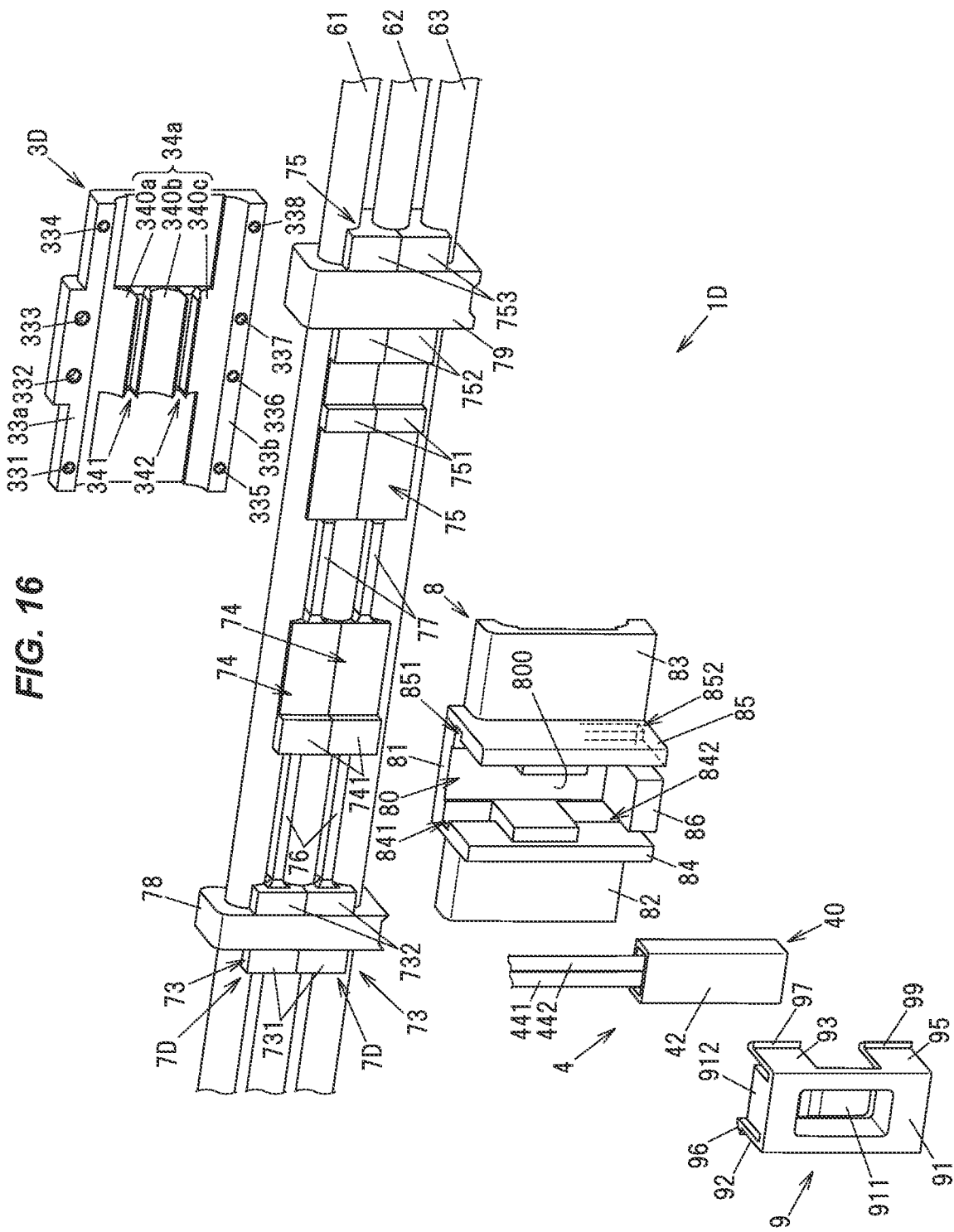
FIG. 16 is an exploded perspective view of the physical quantity detection device in the fifth embodiment.
Figure 17:
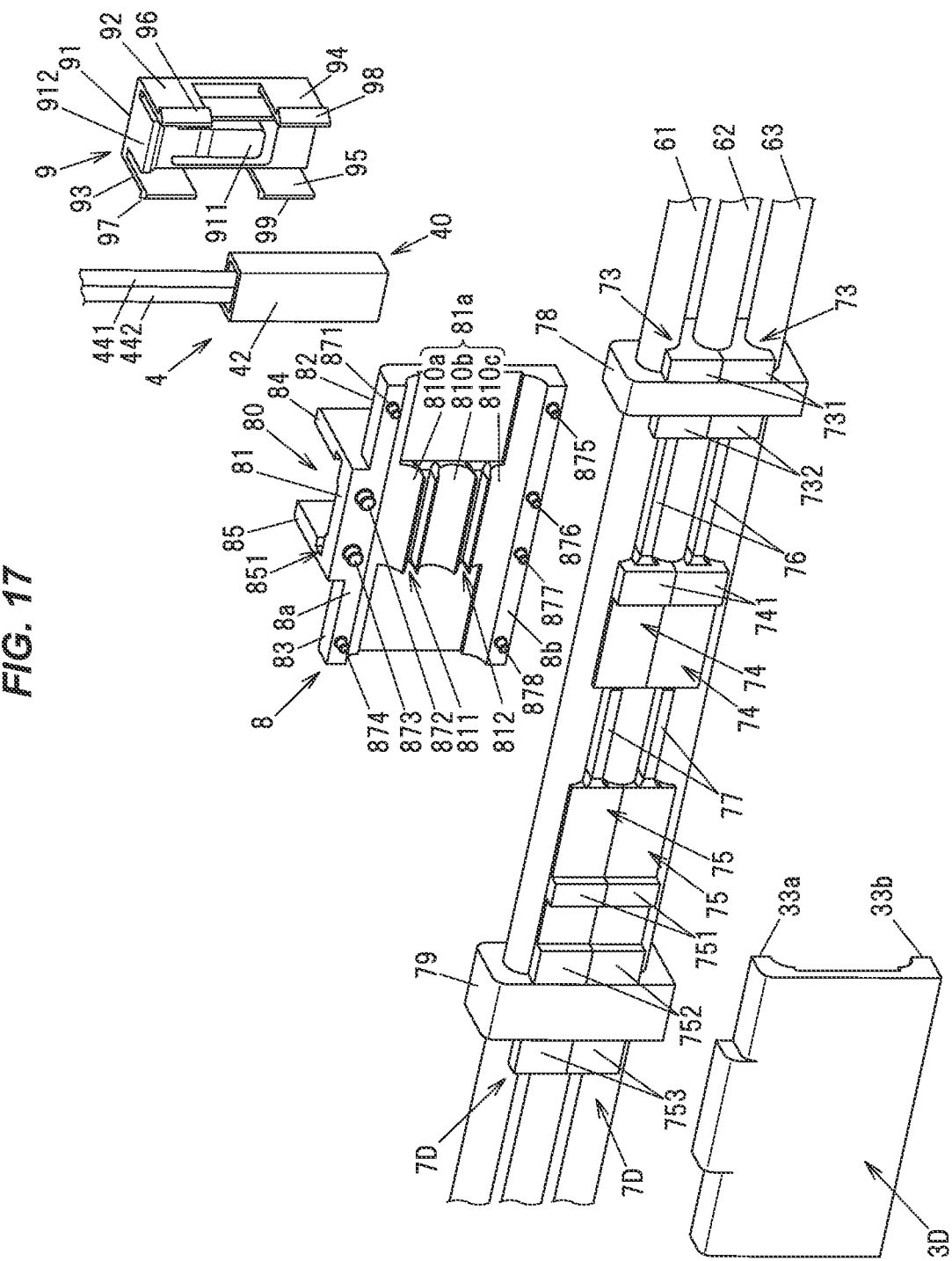
FIG. 17 is an exploded perspective view of the physical quantity detection device in the fifth embodiment.
Figure 18:
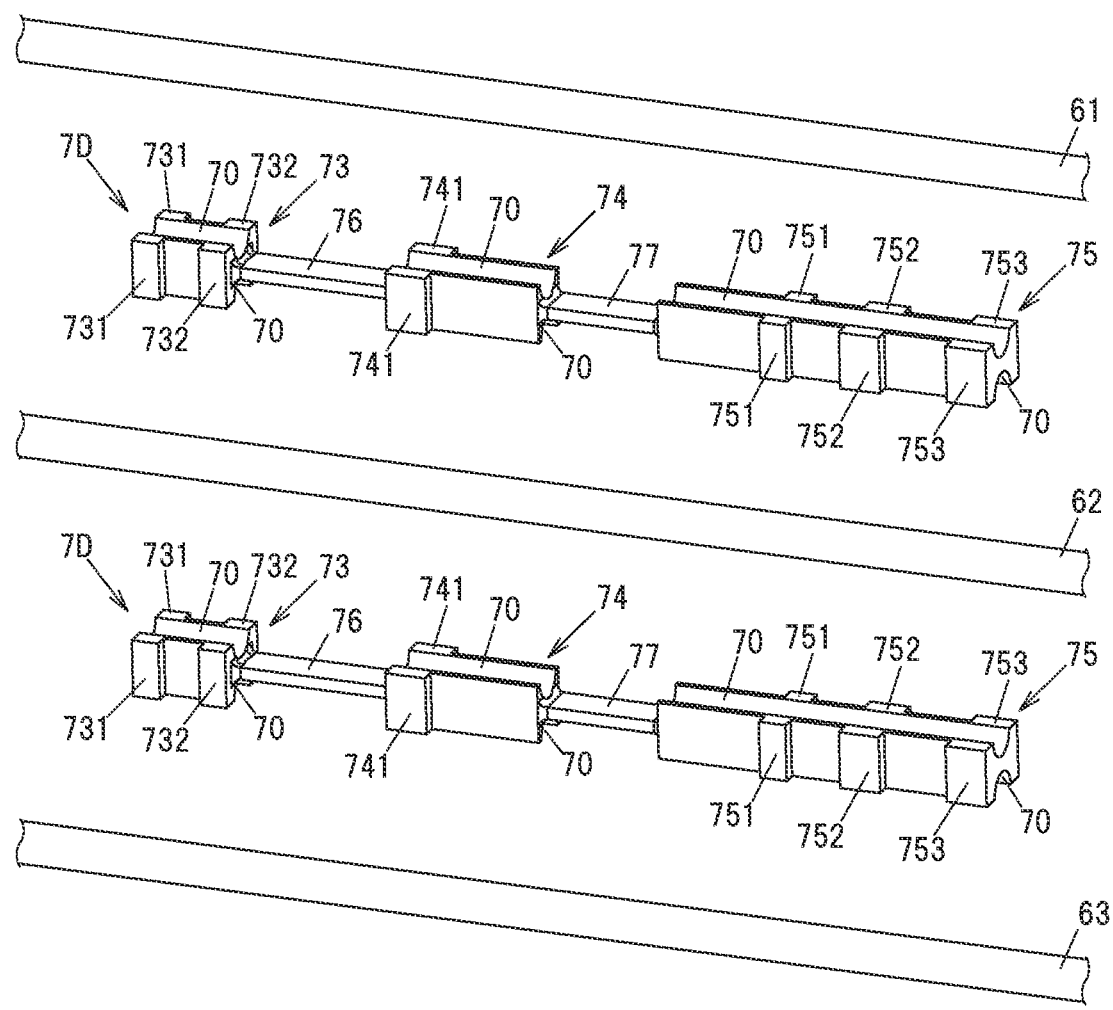
FIG. 18 is a perspective view showing first to third wires and spacers of the physical quantity detection device in the fifth embodiment.
Figure 19:
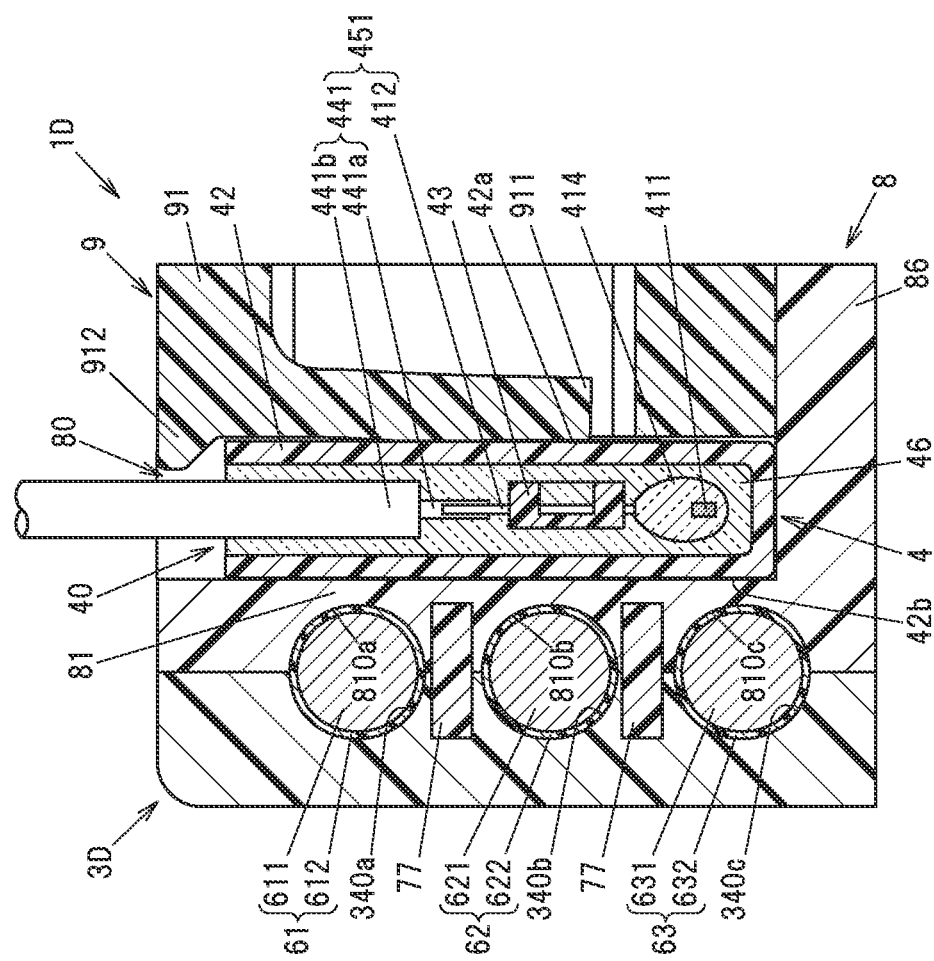
FIG. 19 is a cross-sectional view of the physical quantity detection device in the fifth embodiment.

FIG. 15 is a perspective view showing the physical quantity detection device 1D in the fifth embodiment. FIGS. 16 and 17 are exploded perspective views of the physical quantity detection device 1D in the fifth embodiment. FIG. 18 is a perspective view showing first to third wires 61 to 63 and spacers 7D of the physical quantity detection device 1D in the fifth embodiment. FIG. 19 is a cross-sectional view of the physical quantity detection device 1D in the fifth embodiment. In FIGS. 15 to 19, the constitutional elements common to those described in the first embodiment shall be provided with the same signs as those attached to FIGS. 1A to 7 and the redundant description thereof will be omitted.

The physical quantity detection device 1D includes a first retainer 8 and a second retainer 3D which are placed to sandwich the first to third wires 61 to 63 therebetween, a lid member 9 configured to be locked with the first retainer 8, and a temperature sensor 4. A pair of spacers 7D, 7D are placed between the first wire 61 and the second wire 62 and between the second wire 62 and the third wire 63, respectively. The first retainer 8, the lid member 9, the second retainer 3D, and the spacers 7D, 7D are respectively composed of injection-molded resin.

The second retainer 3D has a first abutting surface 33a configured to abut the first retainer 8 on one side of the alignment direction of the first to third wires 61 to 63, and a second abutting surface 33b configured to abut the first retainer 8 on the other side of the alignment direction of the first to third wires 61 to 63. The first abutting surface 33a is provided with first to fourth fitting holes 331 to 334, and the second abutting surface 33b is provided with fifth to eighth fitting holes 335 to 338.

The opposing surface 34a with respect to the first and third wires 61 to 63 in the second retainer 3D is provided with concave surfaces 340a, 340b, 340c that are recessed in accordance with the circumferences of the first to third wires 61 to 63 respectively. First and second engaging grooves 341, 342 configured to be engaged with respective second connecting portions 77, 77 (to be described below) of the pair of spacers 7D, 7D are formed between the concave surface 340a corresponding to the first wire 61 and the concave surface 340b corresponding to cable 62, and between the concave surface 340b corresponding to the second wire 62 and the concave surface 340c corresponding to the third wire 63, respectively.

The spacer 7D integrally (e.g., as one piece) includes first to third wire-supporting portions 73 to 75 each of which includes a semicircular cross-section groove 70 for accommodating one of the first to third wires 61 to 63, and first and second plate-like connecting portions 76, 77 for connecting the first to third wire-supporting portions 73 to 75 in the longitudinal direction of the first to third wires 61 to 63. The first wire-supporting portion 73 includes first and second anchor portions 731, 732, and the second wire-supporting portion 74 includes a third anchor portion 741. In addition, the third wire-supporting portion 75 includes fourth to sixth anchor portions 751 to 753. The first to sixth anchor portions 731, 732, 741, 751, 752, 753 are protrusions protruding in a direction perpendicular to both the alignment direction of the first to third wires 61 to 63 and the longitudinal direction of the first to third wires 61 to 63.

The pair of spacers 7D, 7D and the first to third wires 61 to 63 are held together by first and second fixing members 78, 79. The first fixing member 78 is located between the first anchor portion 731 and the second anchor portion 732, so as to surround the first wire-supporting portions 73, 73 of the pair of spacers 7D, 7D and the first and third wires 61 to 63 together. The second fixing member 78 is located between the fifth anchor portion 752 and the sixth anchor portion 753, so as to surround the third wire-supporting portions 75, 75 of the pair of spacers 7D, 7D and the first and third wires 61 to 63 together. The first and second fixing members 78, 79, for example, are mold members formed by molding. However, the first and second fixing members 78, 79 may each be composed of a combination of several resin members.

The first retainer 8 is provided with a holding space 80 configured to hold the temperature sensor 4. The holding space 80 has an opening 800 that opens toward the opposite side of the first to third wires 61 to 63, and this opening 800 is closed by a lid member 9. The first retainer 8 includes an intervening wall 81 interposed between the temperature sensor 4 and the first to third wires 61 to 63, first and second side walls 82, 83 on both sides in the alignment direction of the first to third wires 61 to 63 of the intervening wall 81, first and second projected walls 84, 85 facing each other with sandwiching the holding space 80, and a bottom wall 86 provided between the first and second projected walls 84, 85 integrally (as one piece).

The first and second projected walls 84, 85 are provided to protrude from both ends in the alignment direction of the first to third wires 61 to 63 of the intervening wall 81 in the direction perpendicular to both the and the longitudinal direction of the first to third wires 61 to 63. In order to improve the accuracy of temperature detection, as a resin material for the first retainer 8, it is preferable to use a resin material with high thermal conductivity of 1 W/m·K or more, and more preferable to use a material with thermal conductivity of 3 W/m·K or more.

In addition, the first retainer 8 includes a first abutting surface 8a configured to abut the first abutting surface 33a of the second retainer 3D, and a second abutting surface 8b configured to abut the second abutting surface 33b of the second retainer 3D. The first and second abutting surfaces 8a, 8b are provided with first to eighth fitting protrusions 871 to 878 configured to be fitted into first to eighth fitting holes 331 to 338 of the second retainer 3D, respectively. The first retainer 8 and the second retainer 3D are fixed to the first and third wires 61 to 63 by the first to eights engaging protrusions 871 to 878 being fitted into and locked with the first and eighth fitting holes 331 to 338 of the second retainer 3D.

It should be noted that the engagement structure between the first retainer 8 and the second retainer 3D may be either a structure where multiple fitting protrusions of the second retainer 3D are fitted into multiple fitting holes formed in the first retainer 8, or a snap-fit structure.

The opposing surface 81a with respect to the first and third wires 61 to 63 in the intervening wall 81 is provided with concave surfaces 810a, 810b, 810c that are recessed in accordance with the circumferences of the first to third wires 61 to 63 respectively. First and second engaging grooves 811, 812 configured to be engaged with respective second connecting portions 77, 77 of the pair of spacers 7D, 7D are formed between the concave surface 810a corresponding to the first wire 61 and the concave surface 810b corresponding to cable 62, and between the concave surface 810b corresponding to the second wire 62 and the concave surface 810c corresponding to the third wire 63, respectively.

The lid member 9 includes a closing wall 91 configured to close the opening 800 of the holding space 80 of the first retainer 8, first to fourth arms 92 to 95 facing the first and second projected walls 84, 85 of the first retainer 8, and first to fourth protrusions 96 to 99 provided at respective tip ends of the first to fourth arms 92 to 95. The first to fourth arms 92 to 95 are located between the first and second projected walls 84, 85 and the temperature sensor 4. More specifically, the first and third arms 92, 94 are located between the first projected wall 84 and the case member 42 of the temperature sensor 4, and the second and fourth arms 93, 95 are located between the second projected wall 85 and the case member 42 of the temperature sensor 4.

The lid member 9 is attached to the first retainer 8 by the engagement of the first and third protrusions 96, 98 with the engaging recesses 841, 842 formed at the first projected wall 84, and the engagement of the second and fourth protrusions 97, 99 with the engaging recesses 851, 852 formed at the second projected wall 85.

The closing wall 91 of the lid member 9 has an elastic portion 911 configured to press the case member 42 of the temperature sensor 4 toward the intervening wall 81. The elastic portion 911 is a tongue piece shape portion, as a part of the closing wall 91 protruding toward the holding space 80. The case member 42 of the temperature sensor 4 has an abutting surface 42a configured to abut the elastic portion 911, and a side surface 42b opposite to the abutting surface 42a. As shown in FIG. 19, the side surface 42b contacts the intervening wall 81 with no gap. This makes it easier to transfer the heat of the first to third wires 61 to 63 wires from the intervening wall 81 to the case member 42.

In addition, the closing wall 91 of lid member 9 is provided with a locking protrusion 912 configured to lock the case member 42 of the temperature sensor 4 and prevent the main body 40 of the temperature sensor 4 from escaping from the holding space 80 along the alignment direction of the first to third wires 61 to 63. The locking protrusion 912 is provided to face the pair of signal wires 441, 442 and protrude toward the intervening wall 81 of the first retainer 8. The temperature sensor 4 is prevented from being pulled out of the holding space 80 of the first retainer 8 by the lid member 9, and is fixed to the first to third wires 61 to 63 by the first retainer 8 and the second retainer 3D.

This fifth embodiment has the same effect as the first embodiment. This also makes it easier to transfer the heat of the first to third wires 61 to 63 to the case member 42 of the temperature sensor 4, thereby increasing the accuracy of the temperature detection of the first to third wires 61 to 63.

Summary of the Embodiment

Technical ideas understood from the embodiment will be described below citing the reference signs, etc., used for the embodiments. However, each reference sign, etc., described below is not intended to limit the constituent elements in the claims to the members, etc., specifically described in the embodiments.

[1] A physical quantity detection device (1, 1A to 1D) comprising: first and second retainers (2, 2A, 2B, 2D, 3, 3D) arranged to sandwich a wire (61 to 63); and a physical quantity sensor (temperature sensor 4) fixed to the wire (61-63) by the first and second retainers (2, 2A, 2B, 2D, 3, 3D), wherein physical quantity of the wire (61-63) is detected by the physical quantity sensor (4), and wherein the first and second retainers (2, 2A, 2B, 2D, 3, 3D) are fixed to the wire (61 to 63) by being locked with each other.

[2] The physical quantity detection device (1, 1A to 1C) described in [1], wherein the physical quantity sensor (4) is located between the first retainer (2, 2A, 2B) and the wire (61 to 63).

[3] The physical quantity detection device (1, 1A to 1C) described in [1] or [2], wherein the wire (61 to 63) comprises a plurality of wires (61 to 63) arranged in parallel via a spacer (71, 72) between the first and second retainers (2, 3), and at least one of the first and second retainers (2, 3) is engaged with the spacer (71, 72).

[4] The physical quantity detection device (1, 1A to 1C) described in any one of [1] to [3], wherein one retainer (2) of the first and second retainers (2, 3) comprises a plurality of arms (241 to 244) extending toward the other retainer (3), and each end of the plurality of arms (241 to 244) is engaged with the other retainer (3).

[5] The physical quantity detection device (1, 1) described in any one of [1] to [4], further comprising: a sensor holder (5) including a holding space (50) for holding the physical quantity sensor (4), wherein the sensor holder (5) is located between the first retainer (2) and the wire (61 to 63).

[6] The physical quantity detection device (1, 1A) described in [5], wherein the sensor holder (5) further includes an opening (502) being opened toward the first retainer (2), and the opening (502) is closed by the first retainer (2).

[7] The physical quantity detection device (1, 1A) described in [5] or [6], wherein an opposing surface (53a) with respect to the wire (61 to 63) in the sensor holder (5) includes a concave surface (53b, 53c, 53d) being recessed in accordance with a circumference surface of the wire (61 to 63).

[8] The physical quantity detection device (1, 1A) described in any one of [5] to [7], wherein the physical quantity sensor (4) comprises a detection unit (thermistor 41) that converts the physical quantity into an electrical signal, a signal line (451, 452) that transmits the electrical signal, and a case member (42) that houses the detection unit (41), wherein the sensor holder (5) includes a lead-out window (501) configured to lead out the signal line (451, 452) from the holding space (50), and a locking protrusion (51, 52) configured to prevent the case member (42) from escaping out of the lead-out window (501).

[9] The physical quantity detection device (1A) described in [8], wherein the case member (42) is being pressed elastically toward an inner surface (53b) on the wire (61 to 63) side in the holding space (50).

[10] The physical quantity detection device (1B, 1C) described in any one of [1] to [4], wherein the first retainer (2) includes holding space (20) for holding the physical quantity sensor (4), and the holding space (20) is opened toward the wire (61 to 63).

[11] The physical quantity detection device (1B, 1C) described in [10], wherein the physical quantity sensor (4)

comprises a detection unit (41) that converts the physical quantity into an electrical signal, a signal line (451, 452) that transmits the electrical signal, and a case member (42) that houses the detection unit (41), wherein the first retainer (2) includes a lead-out window (201) configured to lead out the signal line (451,452) from the holding space (20), and a locking protrusion (26, 27) configured to prevent the case member (42) from escaping out of the lead-out window (201).

[12] The physical quantity detection device (1C) described in [11], wherein the case member (42) is pressed elastically toward the wire (61 to 63).

[13] The physical quantity detection device (1D) described in [1], wherein the first retainer (8) includes a holding space (80) for holding the physical quantity sensor (4).

[14] The physical quantity detection device (1D) described in [13], wherein the holding space (80) includes an opening (800) being opened toward an opposite side with respect to the wire (61 to 63), and the opening (800) is closed by a lid member (9) configured to be attached to the first retainer (8).

[15] The physical quantity detection device (1D) described in [14], wherein the first retainer (8) further includes an intervening wall (81) interposed between the wire (61 to 63) and the physical quantity sensor (4), and an opposing surface (81a) with respect to the wire (61 to 63) in the intervening wall (81) includes a concave surface (810a, 810b, 810c) being recessed in accordance with a circumference surface of the wire (61 to 63).

[16] The physical quantity detection device (1D) described in [15], wherein the lid member (9) includes an elastic portion (911) configured to press the physical quantity sensor (4) toward the intervening wall (81).

Although the first to fifth embodiments of the invention has been described, the invention according to claims is not to be limited to the embodiments described above. Further, please note that not all combinations of the features described in the embodiment are necessary to solve the problem of the invention.

The invention can also be enforced by its modification and variation as necessity without deviating from its intended purpose. For example, in the second and fourth embodiments, the case where the elastic portion 211 is placed on the outer wall 21 of the first retainer 2 is described, but the present invention is not limited thereto. For example, the elastic portion may be composed of an elastic body such as rubber and spring. In addition, the number of target wires for physical quantity detection is not limited to three, but may be one, two, or more than four wires.

The invention claimed is:

1. A physical quantity detection device, comprising:
first and second retainers arranged to sandwich a wire;
a physical quantity sensor fixed to the wire by the first and second retainers; and
a sensor holder including a holding space for holding the physical quantity sensor,
wherein physical quantity of the wire is detected by the physical quantity sensor, and the first and second retainers are fixed to the wire by being locked with each other, and the sensor holder is located between the first retainer and the wire, and
wherein the sensor holder further includes an opening being opened toward the first retainer, and the opening is closed by the first retainer.

2. The physical quantity detection device according to claim 1, wherein the physical quantity sensor is located between the first retainer and the wire.

3. The physical quantity detection device according to claim 1, wherein the wire comprises a plurality of wires arranged in parallel via a spacer between the first and second retainers, and at least one of the first and second retainers is engaged with the spacer.

4. The physical quantity detection device according to claim 1, wherein one retainer of the first and second retainers comprises a plurality of arms extending toward the other retainer, and each end of the plurality of arms is engaged with the other retainer.

5. A physical quantity detection device, comprising:
first and second retainers arranged to sandwich a wire;
a physical quantity sensor fixed to the wire by the first and second retainers; and
a sensor holder including a holding space for holding the physical quantity sensor,
wherein physical quantity of the wire is detected by the physical quantity sensor, and the first and second retainers are fixed to the wire by being locked with each other, and the sensor holder is located between the first retainer and the wire, and
wherein an opposing surface with respect to the wire in the sensor holder includes a concave surface being recessed in accordance with a circumference surface of the wire.

6. A physical quantity detection device, comprising:
first and second retainers arranged to sandwich a wire;
a physical quantity sensor fixed to the wire by the first and second retainers; and
a sensor holder including a holding space for holding the physical quantity sensor, wherein physical quantity of the wire is detected by the physical quantity sensor, and the first and second retainers are fixed to the wire by being locked with each other, and the sensor holder is located between the first retainer and the wire, and,
wherein the physical quantity sensor comprises a detection unit that converts the physical quantity into an electrical signal, a signal line that transmits the electrical signal, and a case member that houses the detection unit,
wherein the sensor holder includes a lead-out window configured to lead out the signal line from the holding space, and a locking protrusion configured to prevent the case member from escaping out of the lead-out window.

7. The physical quantity detection device according to claim 6, wherein the case member is being pressed elastically toward an inner surface on the wire side in the holding space.

8. The physical quantity detection device according to claim 1, wherein the first retainer includes holding space for holding the physical quantity sensor, and the holding space is opened toward the wire.

9. A physical quantity detection device, comprising:
first and second retainers arranged to sandwich a wire; and
a physical quantity sensor fixed to the wire by the first and second retainers,
wherein physical quantity of the wire is detected by the physical quantity sensor, and the first and second retainers are fixed to the wire by being locked with each other, and the first retainer includes holding space for holding the physical quantity sensor, and the holding space is opened toward the wire, wherein the physical quantity sensor comprises a detection unit that converts the physical quantity into an electrical signal, a signal line that transmits the electrical signal, and a case member that houses the detection unit, and wherein the first retainer includes a lead-out window configured to lead out the signal line from the holding space, and a locking protrusion configured to prevent the case member from escaping out of the lead-out window.

10. The physical quantity detection device according to claim 9, wherein the case member is pressed elastically toward the wire.

11. The physical quantity detection device according to claim 1, wherein the first retainer includes a holding space for holding the physical quantity sensor.

12. A physical quantity detection device, comprising:
first and second retainers arranged to sandwich a wire;
a physical quantity sensor fixed to the wire by the first and second retainers; and
a sensor holder including a holding space for holding the physical quantity sensor, wherein physical quantity of the wire is detected by the physical quantity sensor, and the first and second retainers are fixed to the wire by being locked with each other, wherein the first retainer includes a holding space for holding the physical quantity sensor, and wherein the holding space includes an opening being opened toward an opposite side with respect to the wire, and the opening is closed by a lid member configured to be attached to the first retainer.

13. The physical quantity detection device according to claim 12, wherein the first retainer further includes an intervening wall interposed between the wire and the physical quantity sensor, and an opposing surface with respect to the wire in the intervening wall includes a concave surface being recessed in accordance with a circumference surface of the wire.

14. The physical quantity detection device according to claim 13, wherein the lid member includes an elastic portion configured to press the physical quantity sensor toward the intervening wall.

* * * * *